(No Model.)
H. G. JAMES.
FUNNEL.
No. 530,690. Patented Dec. 11, 1894.
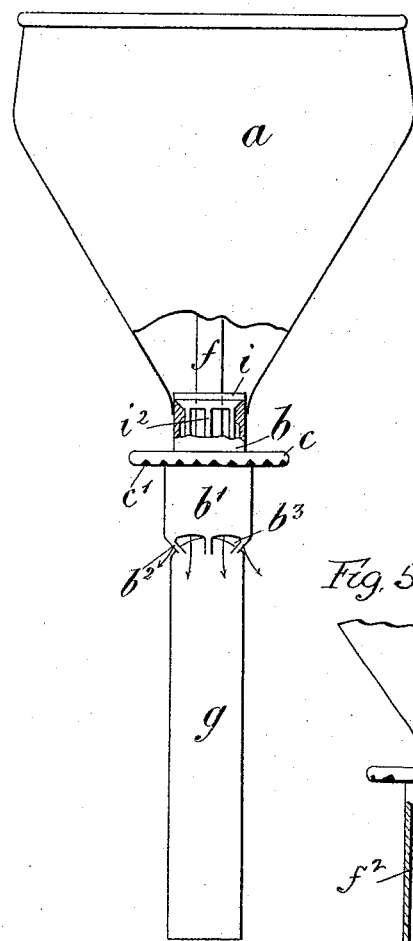
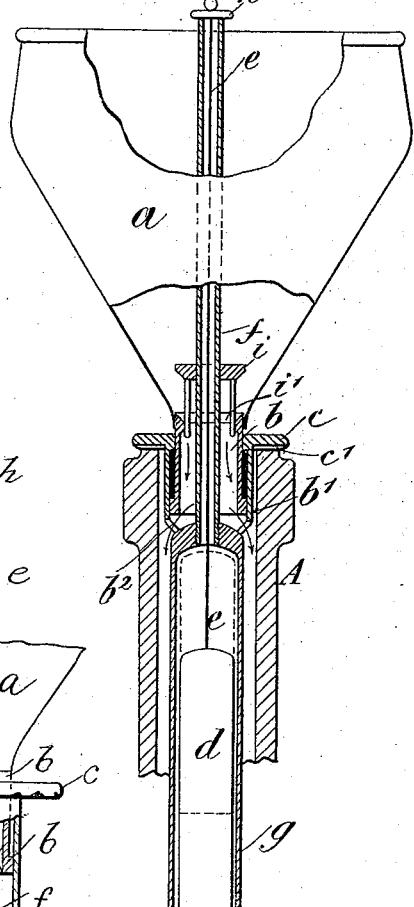
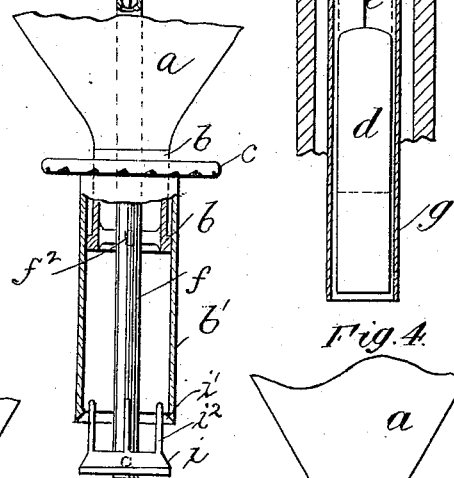
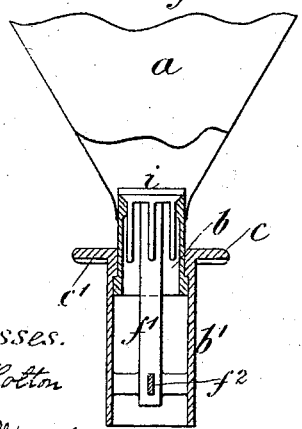
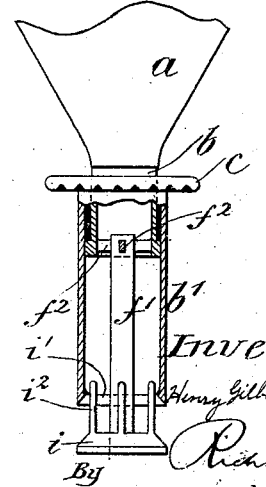
Witnesses.
E. B. Bolton
H. van Oldenneel
Inventor:
Henry Gilbert James
By Richardson
his Attorneys
THE NORRIS PETERS CO., PHOTO-LITHO., WASHINGTON, D. C.

UNITED STATES PATENT OFFICE.

HENRY GILBERT JAMES, OF CORSHAM, NEAR CHIPPENHAM, ENGLAND.

FUNNEL.

SPECIFICATION forming part of Letters Patent No. 530,690, dated December 11, 1894.

Application filed January 20, 1894. Serial No. 497,510. (No model.)

*To all whom it may concern:*

Be it known that I, HENRY GILBERT JAMES, a subject of Her Majesty the Queen of Great Britain and Ireland, residing at Sunnyside, Corsham, near Chippenham, in the county of Wilts, England, have invented certain Improvements in or Appertaining to Funnels or Fillers, of which the following is a specification.

The object of the present invention is to provide a funnel or filler with means which will indicate when the vessel being filled is full or nearly so, and further to so construct and arrange the said funnel or filler that the flow of liquid therefrom will be automatically arrested by the act of removing the same from the vessel being filled.

According to my invention I suspend a float beneath the outlet of the funnel or filler, said float being secured to the lower extremity of a light rod or wire which passes up through a suitable guide or guides in the funnel or filler and is furnished at its upper end with a light disk or other suitably shaped easily seen indicator whereby any movement of the said rod or wire and attached float may be readily followed by the eye. The said float must possess sufficient buoyancy to overcome the weight of and to lift the said rod and indicator and I find a convenient float to consist of a hollow cylinder of aluminium, of which metal I also prefer to construct the rod and indicator although any other suitable material may be employed.

In filling any vessel by means of a funnel or filler provided with a float and indicator as above described the float will be elevated by the rise of the liquid in such vessel and the consequent rise of the indicator will warn the operator when the vessel is sufficiently full. In order to prevent the descending liquid from impinging upon the float and thus preventing the steady rise thereof I prefer to inclose the said float, or the upper portion thereof, within a suitable protecting chamber or tube conveniently secured to the filler, around the sides of which chamber the descending liquid flows. The said protecting chamber which will be formed with an opening or openings at or near the lower part thereof to permit the rising liquid to lift the float, will also serve to protect the float from injury. When filling such vessels as bottles however, in which the rise of the liquid when it reaches the narrow neck is very rapid, the warning given by the indicator would be of little use unless convenient means were also provided for instantly shutting off the further flow of liquid from the funnel or filler immediately upon receipt of such warning. I therefore construct the funnel or filler with a valve which is caused to automatically close the outlet thereof by the act of removing the filler from the vessel, and to automatically open the said outlet by the act of inserting the filler in a vessel. Thus by simply lifting the funnel or filler the instant the indicator shows that the proper amount of liquid has passed through, the further flow of liquid will immediately be arrested and any surplus remaining in the filler will be retained therein and can be transferred to the next vessel to be filled.

A funnel or filler constructed with an indicating float and automatic valve as above set forth will be found especially useful when filling non-transparent or opaque vessels such as wine or beer bottles, casks, tins, jars, and the like in which the height of the liquid contents cannot be seen and which consequently are liable to be overfilled thus causing waste which my invention entirely avoids.

In some cases, as when filling transparent vessels for instance in which the height of the liquid contents can be readily seen I may dispense with the float and indicator, which will not then be required, and retain the automatic valve only.

I will now proceed to fully describe a funnel or filler constructed so as to embody my invention, having reference to the accompanying drawings, in which similar letters refer to corresponding parts in all the figures.

Figure 1 is a part sectional side elevation of a funnel or filler provided with a float and indicator and automatic valve in accordance with my invention, the valve being represented as closed. Fig. 2 is a vertical section of Fig. 1 the automatic valve being represented as open. Fig. 3 is a part sectional side elevation illustrating a funnel or filler provided with the automatic valve only, the float and indicator being dispensed with. Fig. 4 is a part sectional side elevation of a funnel or filler provided with a slightly modified arrangement of automatic valve. Fig. 5 is a detail view of a modification.

Similar letters refer to corresponding parts in all the figures.

$a$ is the head of the funnel or filler and $b$ is the outlet pipe thereof suitably secured thereto.

$b'$ is a tubular sleeve forming a continuation of the outlet pipe $b$ and telescopically arranged so as to slide freely thereon.

$c$ is a horizontal supporting flange encircling the tubular sleeve $b'$ which flange rests upon the edges of the aperture in the vessel to be filled (as upon the rim of a bottle neck $A$ for example; see Fig. 2).

$c'$ are grooves or notches in the under side of flange $c$ which permit the exit of air from said vessel.

$d$ is a float, consisting of a hollow closed cylinder of aluminium secured to the lower end of the light rod or wire $e$.

$g$ is a cylindrical protecting chamber or tube, open at the bottom, within which the float $d$ is capable of sliding freely. The said protecting chamber or tube $g$ is here shown as secured to the tubular sleeve $b'$ by means of the short fingers $b^2$ formed thereon having between them openings $b^3$ for the escape of the liquid as indicated by the arrows. The chief object of this protecting chamber or tube $g$ as before explained is to prevent the descending liquid from impinging upon the float $d$.

$f$ is a tube leading upward from the top of the protecting chamber $g$ through the center of the funnel $a$ and serving as a protecting guide for the wire $e$. The said tube $f$ should terminate as shown above the top of the funnel so as to prevent any liquid from passing down it into the chamber or tube $g$.

$h$ is a light disk or knob of aluminium or other suitable material secured to the upper end of the wire $e$ and serving as an indicator by which the movement of the float $d$ may be readily followed by the eye.

$i$ is a valve firmly secured around the tube $f$ which serves as the spindle thereof.

$i'$ is a valve seat for the valve $i$ formed in the top of the outlet pipe $b$.

$i^2$ are dependent fingers formed around the valve $i$ for maintaining the same central in regard to the valve seat $i'$.

When the funnel or filler is inserted in any vessel to be filled (in a bottle $A$ for example as shown in Fig. 2) the weight of the head or upper part $a$ thereof will cause the outlet tube $b$ to descend its tubular sleeve $b'$ and thus the valve seat $i'$ will be moved away from the valve $i$ which permits the liquid introduced into the funnel $a$ to pass into the bottle through the tube $b$ and its telescopic extension $b'$, as indicated by the arrows. When the liquid in the bottle reaches a sufficient height it will commence to gradually lift the float $d$ and the consequent movement of the indicator $h$ will give warning to the operator who the moment the indicator rises to the height which indicates the bottle to be sufficiently full (which height can easily be ascertained by an experimental trial) will lift and remove the funnel or filler. This will obviously cause the tube $b$ to be withdrawn to its full extent from its sleeve $b'$ and will consequently bring the valve seat $i'$ and valve $i$ together and instantly arrest the further flow of liquid from the funnel or filler, which can then if desired be transferred to another bottle without loss of any surplus liquid it may contain.

In Fig. 3 which represents a funnel or filler for transparent vessels the valve $i$ is mounted on a short valve spindle $f'$ secured to the sleeve $b'$ by the radial arms $f^2$ and the float and indicator with their appurtenances are dispensed with.

Fig. 4 illustrates a modified construction of valve, the same being inverted and arranged to close the lower end of the tubular sleeve $b'$ in lieu of the upper end of the outlet tube $b$.

Fig. 5 illustrates how the tube $f$ may be substituted for the short spindle $f'$ of Fig. 4 should it be desired to combine the float and indicator with this modified arrangement of valve. In this modification where the tube $f$ and indicator similar to that shown in Fig. 1 are used, the valve $i$ is fixed to said tube which in turn will be fixed to the discharge pipe $b$ by the pin $f^2$. I prefer however the arrangement of valve illustrated in Fig. 3.

Although I prefer to employ my automatic valve in conjunction with the float and indicator as illustrated in Figs. 1 and 2 of the drawings yet at the same time it is not always absolutely necessary to do so, especially when filling large vessels (such as casks for example) in which the liquid rises comparatively slowly, since in this case it would probably generally suffice to simply discontinue the supply to the funnel or filler upon receipt of warning from the indicator. I therefore wish it to be understood that I may if desired employ the float and indicator without the automatic valve. It is clear also that the apparatus might be somewhat varied or modified in constructional detail without in any way departing from the spirit of my invention.

What I claim, and desire to secure by Letters Patent of the United States, is—

1. The combination with the funnel terminating in the outlet tube $b$, of a sleeve within which said tube has vertical play, said sleeve being formed with a valve seat at the bottom, the stem secured to the tube $b$, and the valve attached to the lower end of said stem and operated by the vertical movement of the funnel in regard to the sleeve, substantially as described.

2. In combination with the funnel having a discharge tube $b$, a sleeve arranged to slide thereon, the valve arranged to be moved to and from its seat by the movement of the discharge tube and sleeve in relation to each other, the float and indicator rod and means for guiding the indicating rod and also for connecting the valve with the movable part consisting of the tube through which the indicator rod passes said tube carrying fixed thereto the valve which is of annular ring form surrounding the tube, substantially as described.

In testimony whereof I have signed my name to this specification, in the presence of two subscribing witnesses, this 8th day of January, A. D. 1894.

HENRY GILBERT JAMES.

Witnesses:
R. H. CARPENTER,
*Solicitor, Bristol, England.*
JNO. J. DODD,
*3 Clifton Place, Clifton, Bristol, England,*
*Solicitor's Clerk.*